United States Patent
Lin et al.

(10) Patent No.: US 12,555,832 B2
(45) Date of Patent: Feb. 17, 2026

(54) DETECTION DEVICE AND PROBE MODULE THEREOF

(71) Applicant: CHROMA ATE INC., Taoyuan (TW)

(72) Inventors: Chuan-Tse Lin, Taoyuan (TW);
Chen-Chou Wen, Taoyuan (TW);
Shih-Chin Tan, Taoyuan (TW);
Wen-Chuan Chang, Taoyuan (TW);
Ying-Cheng Chen, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 524 days.

(21) Appl. No.: 18/207,171

(22) Filed: Jun. 8, 2023

(65) Prior Publication Data
US 2024/0097216 A1 Mar. 21, 2024

(30) Foreign Application Priority Data
Sep. 21, 2022 (TW) .................... 111135807

(51) Int. Cl.
*H01M 10/48* (2006.01)
*H01M 10/42* (2006.01)
(52) U.S. Cl.
CPC ....... *H01M 10/4285* (2013.01); *H01M 10/48* (2013.01)

(58) Field of Classification Search
None
See application file for complete search history.

(56) References Cited

U.S. PATENT DOCUMENTS

2025/0096302 A1* 3/2025 Oh ...................... H01M 10/482

* cited by examiner

*Primary Examiner* — Carlos Barcena
(74) *Attorney, Agent, or Firm* — WPAT, PC

(57) ABSTRACT

The present invention discloses a detection device and a probe module thereof, wherein an electrical connection path between a battery detection frame and a battery under test is provided via the probe module. The probe module includes a base, a first polarity plate, a second polarity plate, a first upper connection group, a second upper connection group, a first lower connection member and a second lower connection member. Via the first polarity plate, the first upper connection group is correspondingly coupled to the battery detection frame, and the first lower connection member is correspondingly coupled to the battery under test. Via the second polarity plate, the second upper connection group is correspondingly coupled to the battery detection frame, and the second lower connection member is correspondingly coupled to the battery under test. Thus, it is not necessary to process a cable having been fixed on the battery detection frame when the probe module is replaced. Moreover, since each polarity has dedicated coupling elements respectively corresponding to the battery detection frame and the battery under test, reliability is enhanced.

13 Claims, 9 Drawing Sheets

DETECTION DEVICE AND PROBE MODULE THEREOF

BACKGROUND OF THE INVENTION

Field of the Invention

The present invention relates to a detection device and a probe module used in the detection device, and more particularly to a detection device and a probe module for battery detection.

Description of the Prior Art

A qualifying battery needs to undergo charging/discharging testing in order to ensure that a manufactured battery fulfills safety specifications or regulations. An electrical connection to a battery under test is provided by a probe module of a test device so as to perform a test procedure.

One end of each probe is for connecting to a corresponding cable, and the other end of the cable is for electrically connecting to the battery under test. These wires are installed in the test device, and are connected to the corresponding probes in one after another. However, when the probes as consumables need to be replaced, replacement complications are made challenging by the large number of cables. For example, a test device is provided with numerous probes, and once new probes are provided after the replacement, connection errors are likely resulted if re-connections of the corresponding cables are not tested one after another. However, such sequential detection procedure is quite time consuming and hence non-ideal in terms of feasibility.

SUMMARY OF THE INVENTION

It is an object of the present invention to reduce replacement complications for a probe module in a detection device.

It is another object of the present invention to ensure reliability of a probe module.

To achieve the above and other objects, the present invention provides a probe module to provide corresponding electrical connection paths between a first electrode region and a second electrode region of a batter detection frame and a battery under test. The probe module includes a base, a first polarity plate, a second polarity plate, a first upper connection group, a second upper connection group, at least one first lower connection member and at least one second lower connection member. The first polarity plate and the second polarity plate are both carried on an upper surface of the base, and the second polarity plate is spaced from the first polarity plate. The first upper connection group is for providing electrical connection path between the battery detection frame and the first polarity plate. The second upper connection group is for providing electrical connection path between the battery detection frame and the second polarity plate. The first lower connection member passes through the base and is coupled to the first polarity plate. The first lower connection member protrudes downward from a lower surface of the base, and is telescopic so as to movably provide electrical connection path between the battery under test and the first polarity plate. The second lower connection member passes through the base and is coupled to the second polarity plate. The second lower connection member protrudes downward from the lower surface of the base, and is telescopic so as to movably provide electrical connection path between the battery under test and the second polarity plate.

According to an embodiment of the present invention, the first upper connection group includes a first connection seat and a first upper connection member. The first connection seat is configured on an upper surface of the first polarity plate. The first upper connection member is disposed on the first connection seat, a lower end of the first upper connection member is coupled to the first polarity plate, and an upper end of the first connection member is telescopic so as to movably abut against a first electrode region.

According to an embodiment of the present invention, the second upper connection group includes a second connection seat and a second upper connection member. The second connection seat is configured on an upper surface of the second polarity plate. The second upper connection member is disposed on the second connection seat, a lower end of the second upper connection member is coupled to the second polarity plate, and an upper end of the second connection member is telescopic so as to movably abut against a second electrode region.

According to an embodiment of the present invention, the first upper connection member and the second upper connection member may be pogo pins.

According to an embodiment of the present invention, the first upper connection group includes a first floating connection seat, a first extension plate, a plurality of first pins, at least one first fixing unit and two first elastic support members. The first floating connection seat has a support portion extending from each of both sides thereof. The first extension plate extends from the upper surface of the first polarity plate, extends toward a direction of the second polarity plate and extends through below the first floating connection seat via a first bend portion, and extends to a front side of the first floating connection seat via a second bend portion. The first pins are disposed at the first floating connection seat and each has a contact section exposed from a top surface of the first floating connection seat. The contact section is for abutting against the first electrode region, wherein one end of each first pin opposite to the contact section is coupled to the first extension plate. The first fixing unit passes through the first extension plate, and fixes one end of the first extension plate on the front side of the first floating connection seat. On end of each first elastic support member passes through the first polarity plate and is disposed at the base, and the other end is disposed at the first floating connection seat. Each first elastic support member provides the first floating connection seat with a restoring force when receiving an external force from a downward pressure, so as to enhance a stable connection ability between the contact sections of the first pins and the first electrode region.

According to an embodiment of the present invention, the second upper connection group includes a second floating connection seat, a second extension plate, a plurality of second pins, at least one second fixing unit and two second elastic support members. The second floating connection seat has a support portion extending from each of both sides thereof. The second extension plate extends from the upper surface of the second polarity plate, extends toward a direction of the first polarity plate and extends through below the second floating connection seat via a first bend portion, and extends to a front side of the second floating connection seat via a second bend portion. The second pins are disposed at the second floating connection seat and each has a contact section exposed from a top surface of the second floating connection seat. The contact section is for abutting against the second electrode region, wherein one end of each second pin opposite to the contact section is coupled to the second extension plate. The second fixing unit passes through the second extension plate, and fixes one end of the second extension plate on the front side of the second floating connection seat. On end of each second elastic support member passes through the second polarity plate and is disposed at the base, and the other end is disposed at the second floating connection seat. Each second elastic support member provides the second floating connection seat with a restoring force when receiving an external force from a downward pressure, so as to enhance a stable connection ability between the contact sections of the second pins and the first electrode region.

According to an embodiment of the present invention, the battery detection frame is provided with a first insert piece serving as the first electrode region, and the first upper connection group includes a first connection seat, at least one first fixing unit, a first pressing piece and a plurality of first pins. The first connection seat is configured on an upper surface of the first polarity plate. The first pressing piece is configured on a front side of the first connection seat via the first fixing unit, and a gap is present between the first pressing piece and the first connection seat so as to form a first insert slot for insertion of the first insert piece. The first pins are disposed at the first connection seat and each has a contact section protruding from the front side of the first connection seat. The contact section of each first pin is for abutting against the first insert piece inserted in the first insert slot, wherein one end of each first pin opposite to the contact section is coupled to the first polarity plate.

According to an embodiment of the present invention, the battery detection frame is provided with a second insert piece serving as the second electrode region, and the second upper connection group includes a second connection seat, at least one second fixing unit, a second pressing piece and a plurality of second pins. The second connection seat is configured on an upper surface of the second polarity plate. The second pressing piece is configured on a front side of the second connection seat via the second fixing unit, and a gap is present between the second pressing piece and the second connection seat so as to form a second insert slot for insertion of the second insert piece. The second pins are disposed at the second connection seat and each has a contact section protruding from the front side of the second connection seat. The contact section of each second pin is for abutting against the second insert piece inserted in the second insert slot, wherein one end of each second pin opposite to the contact section is coupled to the second polarity plate.

According to an embodiment of the present invention, the second polarity plate has two surrounding portions extending toward both sides of the base on an upper surface of the base, wherein the two surrounding portions surround a portion of the first polarity plate.

According to an embodiment of the present invention, the second lower connection member is plural in quantity. These second connection members include two lower connection members respectively connected to end portions of the two surrounding portions and at least one second lower connection member connected to an intermediate portion of the second polarity plate, wherein the first lower connection member is connected to the first polarity plate at a position close to a front end of the second polarity plate.

According to an embodiment of the present invention, the first upper connection group is disposed on the first polarity plate and is for coupling to the first electrode region once the base is fixed at the battery detection frame, and the second upper connection group is disposed on the second polarity plate and is for coupling to the second electrode region once the base is fixed at the battery detection frame.

According to an embodiment of the present invention, the first lower connection member and the second lower connection member may be pogo pins.

To achieve the above and other objects, the present invention further provides a detection device including a battery detection frame and a plurality of the probe modules described above. The battery detection frame includes a plurality of electrode portions coupled to a battery under test via connections of cables in one-on-one correspondence, wherein each electrode portion has a first electrode region and a second electrode region. The probe modules are fixed on the battery detection frame and are for providing electrical connection paths between the battery detection frame and the battery under test.

Accordingly, the probe modules serve as electrical connection interfaces between the battery detection frame and the battery under test, and each cable only needs to be fixed on the battery detection frame. To replace the probe modules, it is not necessary to process the cables having been fixed on the battery detection frame, so that the probe modules can be easily replaced.

Moreover, on each probe module, each polarity has dedicated coupling elements respectively corresponding to the battery detection frame and the battery under test (for example, for one of the polarities, the first upper connection group corresponding to the first electrode region of the battery detection frame and the first lower connection member corresponding to the battery under test, respectively). Thus, when a detection procedure is carried out, only the first and second lower connection members are frequently abutted and compressed (when coupled to the battery under test) or disengaged and restored (when the battery under test is removed). Therefore, the first and second electrode regions of the battery detection frame are not affected, hence eliminating the issue of likely being deteriorated and damaged due to frequent repeated abutment, as well as ensuring the reliability of the probe module.

DETAILED DESCRIPTION OF THE EMBODIMENTS

Objectives, features, and advantages of the present disclosure are hereunder illustrated with specific embodiments, depicted with drawings, and described below.

In the disclosure, descriptive terms such as "a" or "one" are used to describe the unit, component, structure, device, module, portion, section or region, and are for illustration purposes and providing generic meaning to the scope of the present invention. Therefore, unless otherwise explicitly specified, such description should be understood as including one or at least one, and a singular number also includes a plural number.

In the disclosure, descriptive terms such as "include, comprise, have" or other similar terms are not for merely limiting the essential elements listed in the disclosure, but can include other elements that are not explicitly listed and are however usually inherent in the units, components, structures, devices, modules, portions, sections or regions.

In the disclosure, the terms similar to ordinals such as "first" or "second" described are for distinguishing or referring to associated identical or similar components or structures, and do not necessarily imply the orders of these components, structures, portions, sections or regions in a spatial aspect. It should be understood that, in some situations or configurations, the ordinal terms could be interchangeably used without affecting the implementation of the present invention.

In the disclosure, the term "coupled" used refers to two or multiple elements or devices being directly and physically in contact with each other, or indirectly and physically in contact with each other, or may refer to two or more elements or devices operating or acting with each other or directly or indirectly electrically (by electricity or electrical signals) connected to each other.

Figure 1:
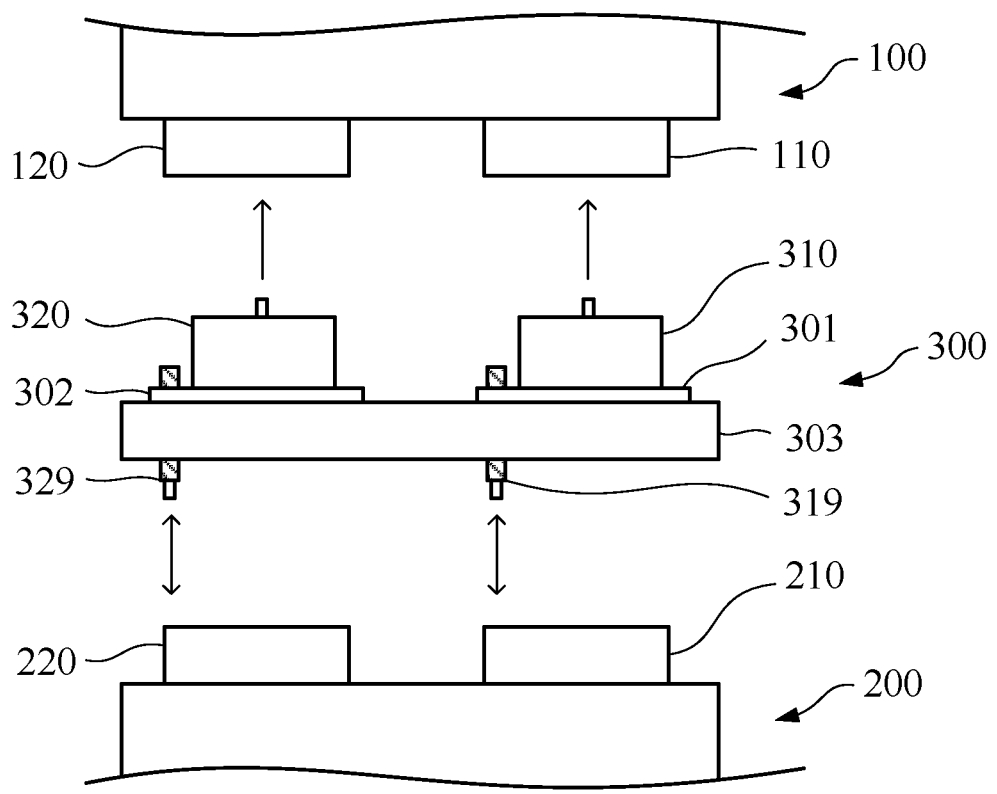
FIG. 1 is a schematic diagram of an electrical connection relation between a detection device and a battery under test according to an embodiment of the present invention.
Figure 2:
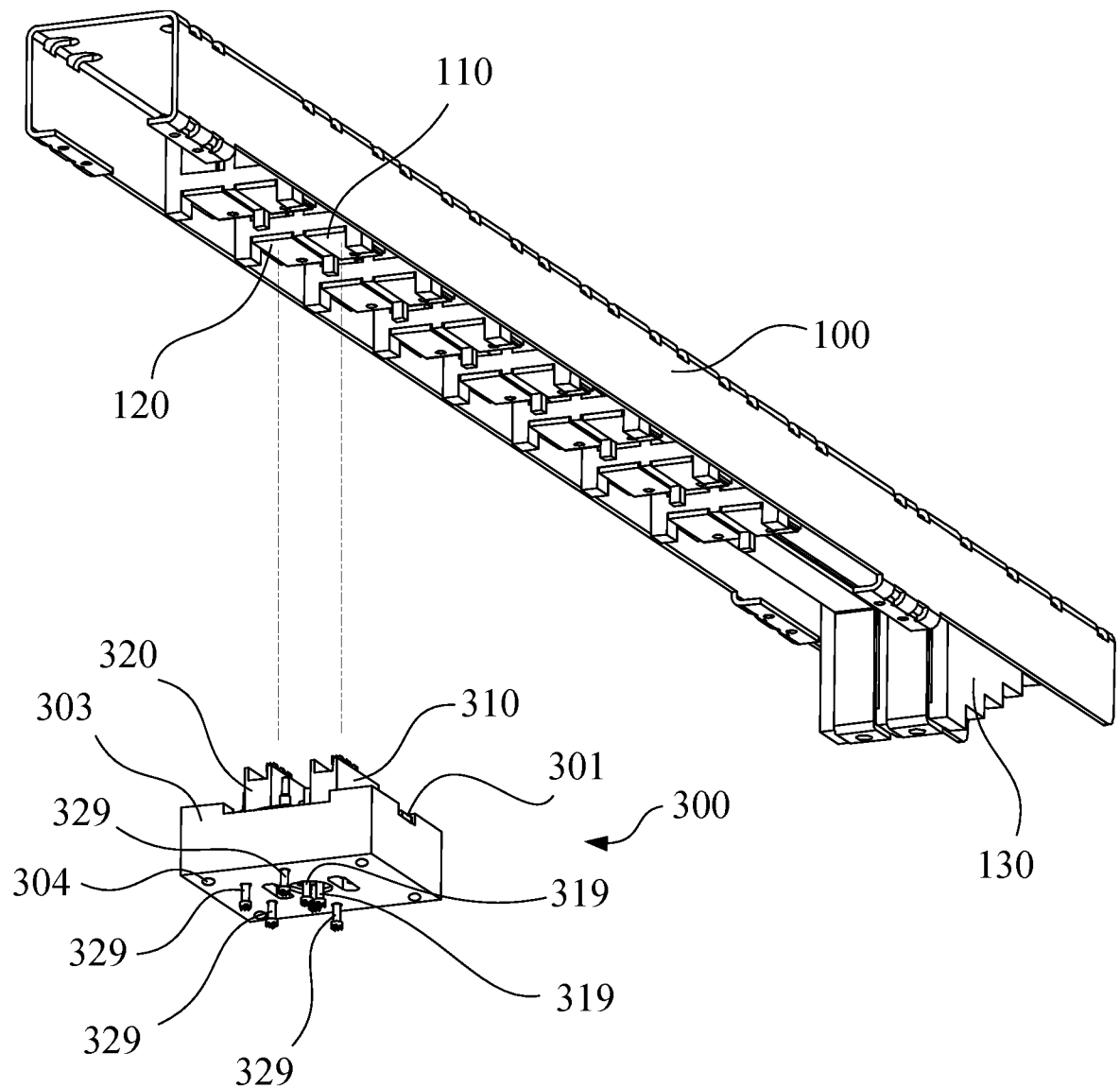
FIG. 2 is a perspective schematic diagram of a detection device according to an embodiment of the present invention.

Referring to FIG. 1 and FIG. 2, FIG. 1 shows schematic diagram of an electrical connection relation between a detection device and a battery under test according to an embodiment of the present invention, and FIG. 2 shows a perspective schematic diagram of a detection device according to an embodiment of the present invention.

The detection device includes a battery detection frame 100 and a plurality of the probe modules 300. For illustration purposes, FIG. 2 shows only one battery detection frame 100 and one probe module 300. In FIG. 2, a pair of electrode regions (110, 120) on the battery detection frame 100 may correspond to a group of cables (not shown, for example, one electrode region corresponds to one cable). One end of the cable is electrically connected to the corresponding electrode region (110 or 120), and the other end of the cable is extended to a cable connection region 130 configured on one end of the battery detection frame 100. Each electrode region (110, 120) corresponds to one probe module 300, and FIG. 2 shows one of the probe modules 300. In the example in FIG. 2, the cables extended from the respective pair of electrode regions (110, 120) are gathered to one of the ends of the battery detection frame 100 shaped as a rectangle, and then together connected to a power supply source at the end; for example, these cables are connected to an external power supply device. However, the present invention is not limited to the example above; other configuration positions for the cable connection region 130, for example, a position configured on a side of the battery detection frame 100, is also applicable.

Each probe module 300 serves as a corresponding electrical connection path between the battery detection frame 100 and a battery under test 200. The battery under test 200 has a first polarity electrode 210 and a second polarity electrode 220 for outputting electric energy (that is, discharging) or drawing electric energy (that is, charging). Via the probe module 300, the first polarity electrode 210 of the battery under test 200 can be coupled to the first electrode region 110 of the battery detection frame 100, and the second polarity plate 220 of the battery under test 200 can be coupled to the second electrode region 120 of the battery detection frame 100.

As shown in FIG. 1, the probe module 300 includes a base 303, a first polarity plate 301, a second polarity plate 302, a first upper connection group 310, a second upper connection group 320, a first lower connection member 319 and a second lower connection member 329. The first polarity plate 301 and the second polarity plate 302 are separated from each other, and both the first polarity plate 301 and the second polarity plate 302 are carried on an upper surface of the base 303. The first polarity plate 301 and the second polarity plate 302 respectively occupy different regions on the upper surface of the base 303.

The first upper connection group 310 provides an electrical connection path between the battery detection frame 100 and the first polarity plate 301; on the other hand, the second upper connection group 320 provides an electrical connection path between the battery detection frame 100 and the second polarity plate 302.

The first lower connection member 319 passes through the base 303 so as to be coupled to the first polarity plate 301. Moreover, the first lower connection member 319 can be configured to protrude downward from a lower surface of the base 303, and is implemented by a telescopic component, for example but not limited to, a pogo pin, so as to be abutted by the first polarity plate 210 of the battery under test 200. The first lower connection group 319 can accordingly movably provide an electrical connection path between the first polarity electrode 210 of the battery under test 200 and the first polarity plate 301.

Similarly, the second lower connection member 329 may be configured to pass through the base 303 and be coupled to the second polarity plate 302. The second lower connection member 329 protrudes downward from the lower surface of the base 303, and is implemented by a telescopic component, for example but not limited to, a pogo pin, so as to be abutted by the second polarity plate 220 of the battery under test 200. The second lower connection group 329 can accordingly movably provide an electrical connection path between the second polarity electrode 220 of the battery under test 200 and the second polarity plate 302.

The numbers of the first lower connection member 319 and the second lower connection member 329 configured may be determined by a required size of a current that passes through; larger numbers of first lower connection member 319 and the second lower connection member 329 may be configured as the current gets larger. These first lower connection members 319 are for coupling between the first polarity plate 301 and the first polarity electrode 210; similarly, these second lower connection members 329 are for coupling between the second polarity plate 302 and the second polarity electrode 220.

The probe module 300 serves as an electrical connection interface between the battery detection frame 100 and the battery under test 200. The probe module 300 is detachably disposed on the battery detection frame 100, and each cable on the battery detection frame 100 is fixed and is coupled to the corresponding probe module 300 via the corresponding first electrode region 110 and second electrode region 120. Thus, the probe module 300 can be easily replaced during maintenance without involving the cables provided on the battery detection frame 100. Unless damaged, these cables can be secured on the battery detection frame 100, and are independent from the probe modules 300.

In terms of electrical connection, via the first upper connection group 310 and the second upper connection group 320 of the probe module 300, when the probe module 300 is disposed on the battery detection frame 100 (for example, via a locking hole 304 and a corresponding locking element), the first upper connection group 310 and the second upper connection group 320 can be coupled to the corresponding first electrode region 110 and second electrode region 120. With the movement of the battery detection frame 100 and/or the movement of the battery under test 200, the battery under test 200 abuts against the first lower connection member 319 and the second lower connection member 329 of the corresponding probe module 300, so as to carry out a detection procedure.

In general, when one end of a single connection member is abutted, the other end likely produces an additional pressure on an electrical connection point due to being the same element, and poor contact may be resulted over an extended period of time. In contrast, according to the embodiment, since the upper connection groups (310, 320) and the lower connection members (319, 329) are separately and individually coupled to polarity plates (301, 302) shaped as plates, the abutting pressure generated by corresponding abutment when the lower connection members (319, 329) are coupled does not affect the upper connection groups (310, 320). Thus, the stability in the electrical connection of the upper connection groups (310, 320) constantly coupled to the battery detection frame 100 can be ensured.

Figure 3:
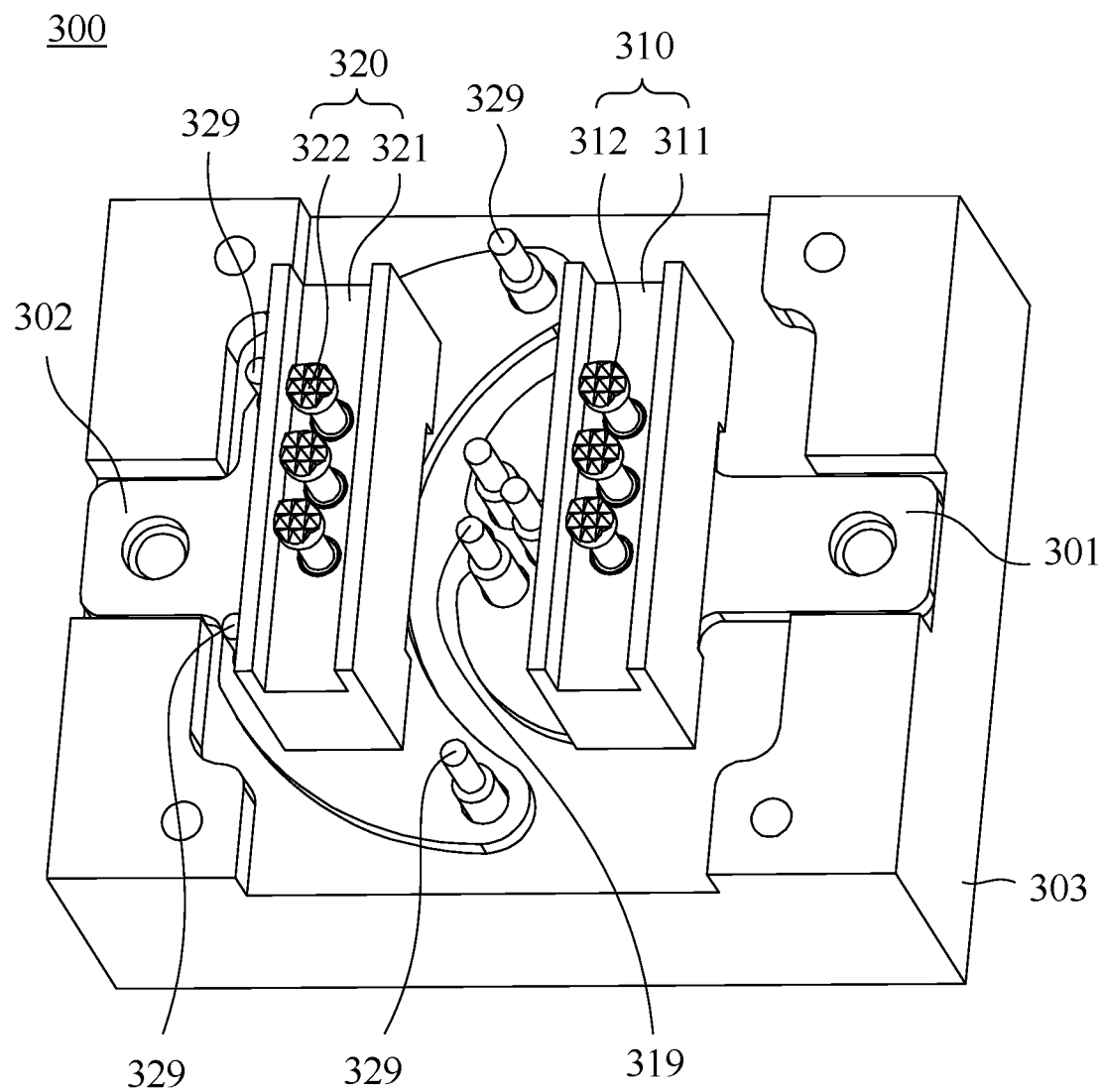
FIG. 3 is a perspective schematic diagram of a probe module according to an embodiment of the present invention.
Figure 4:
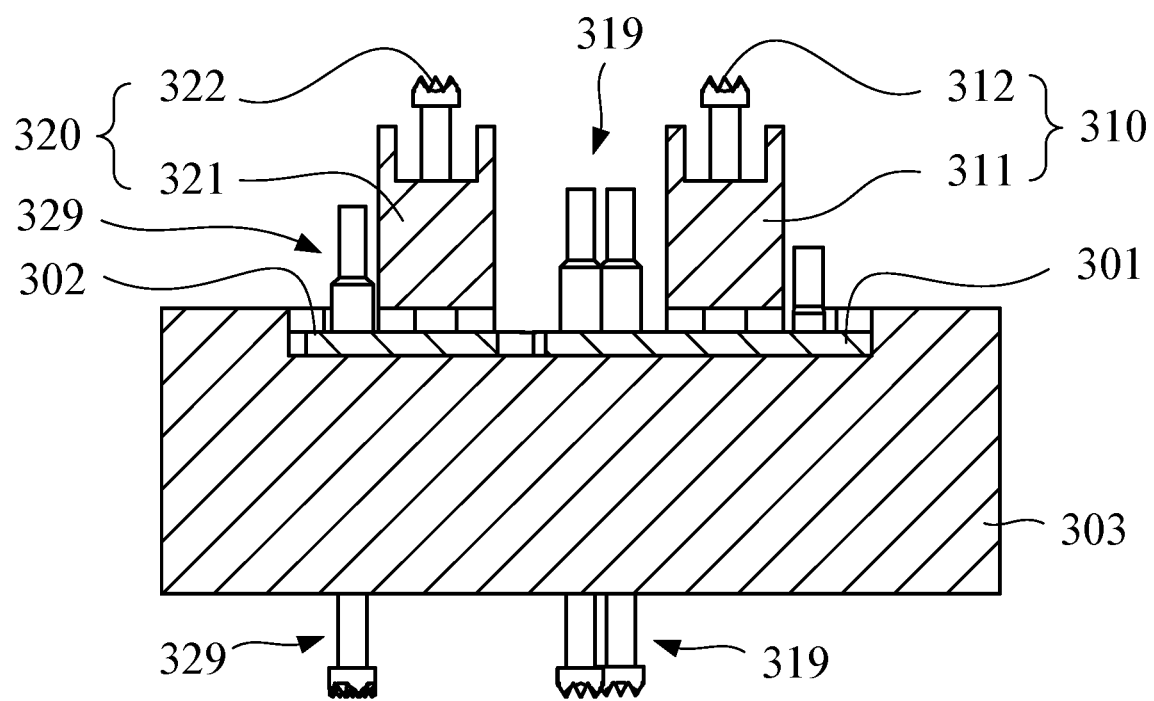
FIG. 4 is a partial section schematic diagram of a probe module according to a first embodiment of the present invention.

Referring to both FIG. 3 and FIG. 4, FIG. 3 shows a perspective schematic diagram of a probe module according to a first embodiment of the present invention, and FIG. 4 shows a partial section schematic diagram of a probe module according to the first embodiment of the present invention.

In the first embodiment, the first upper connection group 310 includes a first connection seat 311 and a first upper connection member 312, and the second upper connection group 320 includes a second connection seat 321 and a second upper connection member 322. As shown in FIG. 4, the first connection seat 311 is configured on an upper surface of the first polarity plate 301. For example but not limited to, the first connection seat 311 can be fixed at the base 303 by a fixing element passing through the first polarity plate 301, such that the first connection seat 311 is kept on the first polarity plate 301. Moreover, the first upper connection member 312 is disposed on the first connection seat 311, an upper end of the first upper connection member 312 is for abutting against the first electrode region 110 (referring to FIG. 2) of the battery detection frame 100, and a lower end of the first upper connection member 312 is for coupling to the first polarity plate 301.

In the first embodiment, configuration details of the second connection seat 321 and the second upper connection member 322 are similar to the configuration details of the first connection seat 311 and the first upper connection member 312, and such repeated details of the second upper connection group 320 are omitted.

Moreover, as shown in FIG. 3 and FIG. 4, a position at which the first lower connection member 319 is coupled to the first polarity plate 301 is different from a position at which the first upper connection member 312 is coupled to the first polarity plate 301, and the first upper connection member 312 is not affected when the first lower connection member 319 is abutted. In addition, a position at which the second lower connection member 329 is coupled to the second polarity plate 302 is different from a position at which the second upper connection member 322 is coupled to the second polarity plate 302, and the second upper connection member 322 is not affected when the second lower connection member 329 is abutted. Moreover, the first upper connection member 312 and the second upper connection member 322 may be implemented by telescopic components, for example but not limited to, pogo pins. In addition, as shown in FIG. 3 and FIG. 4, the first connection seat 311 and the second connection seat 321 may be configured with protruding limiting portions on two side edges of top surfaces thereof to provide a limitation for a shortest distance between the battery detection frame 100 and the probe module 300.

Figure 5:
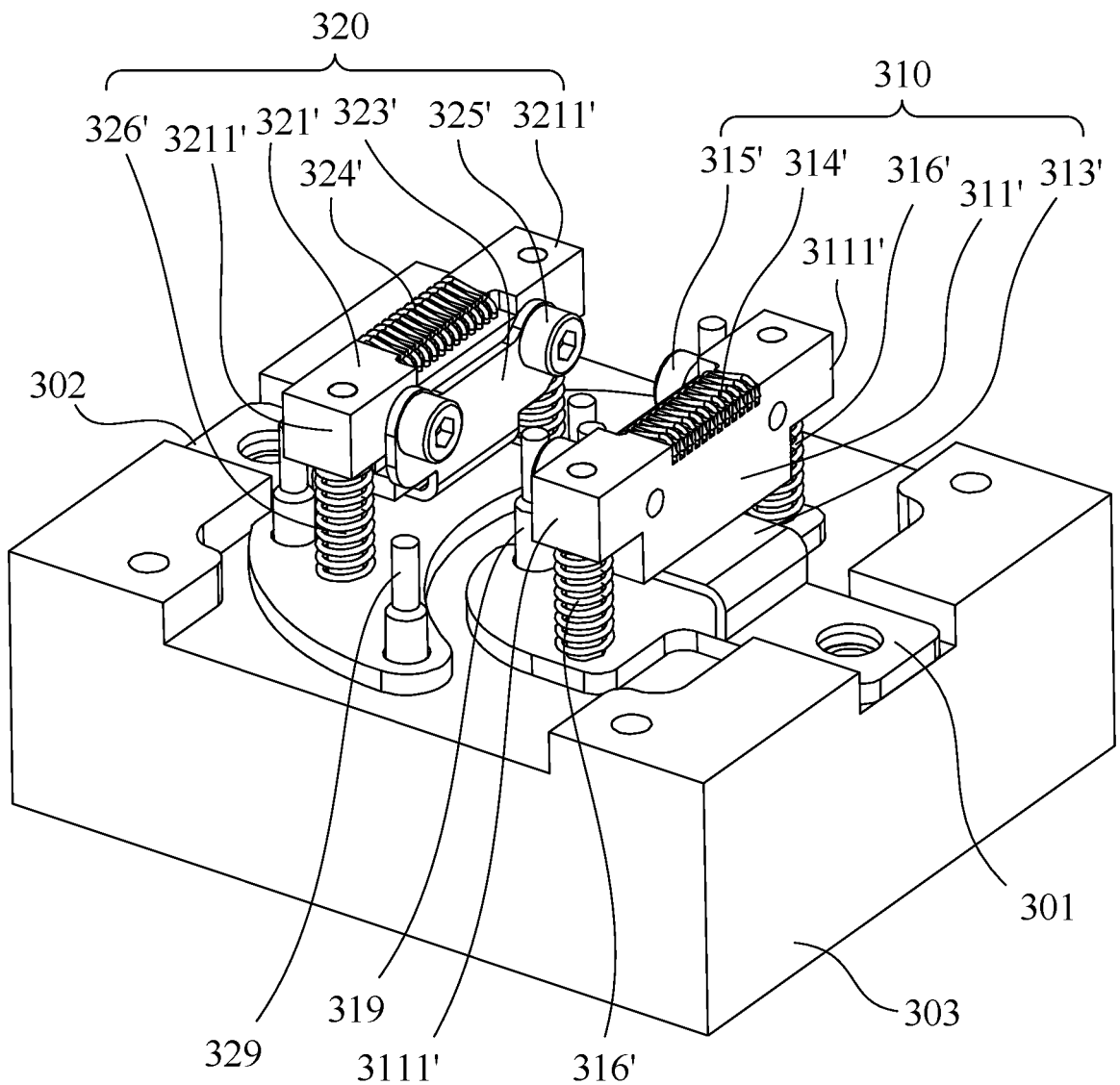
FIG. 5 is a perspective schematic diagram of a probe module according to a second embodiment of the present invention.
Figure 6:
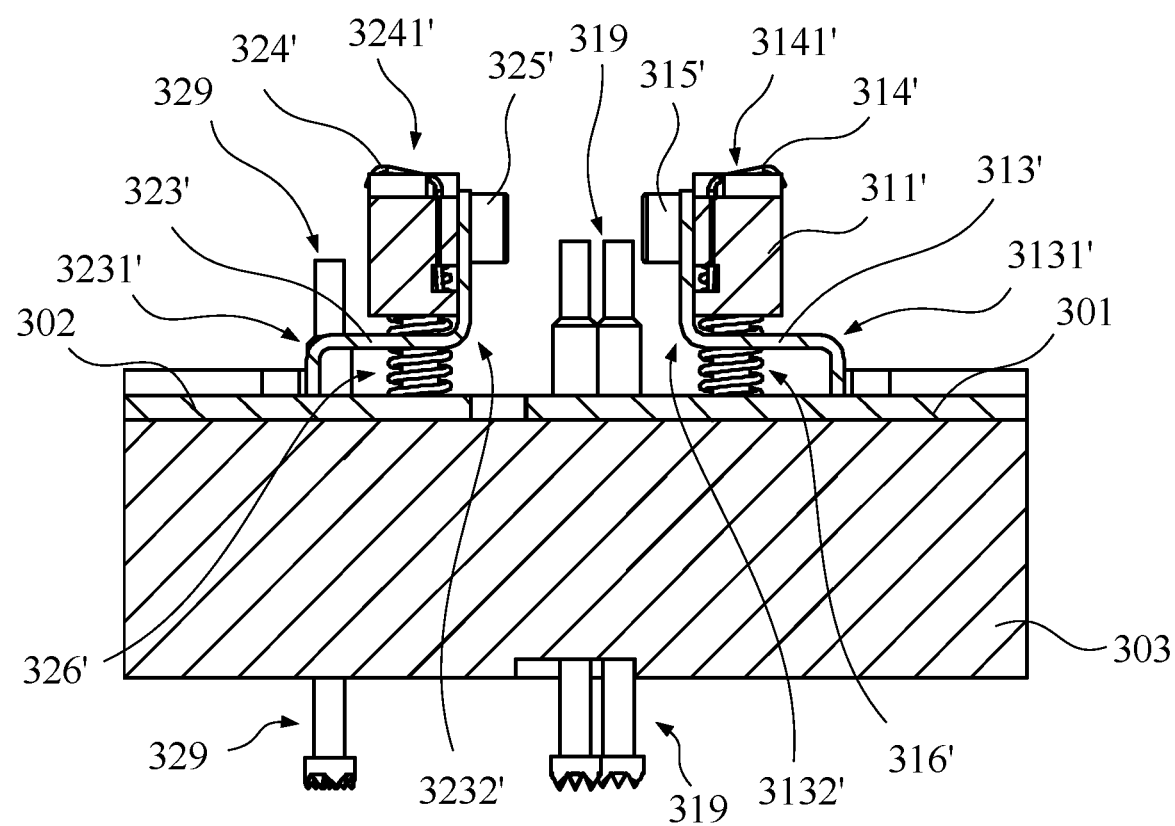
FIG. 6 is a partial section schematic diagram of a probe module according to the second embodiment of the present invention.

Referring to both FIG. 5 and FIG. 6, FIG. 5 shows a perspective schematic diagram of a probe module according to a second embodiment of the present invention, and FIG. 6 shows a partial section schematic diagram of a probe module according to the second embodiment of the present invention.

In the second embodiment, the first upper connection group 310 includes a first floating connection seat 311', a first extension plate 313', a plurality of first pins 314', a first fixing unit 315', two first elastic support members 316', a support portion 3111', a contact section 3141', a first bend portion 3131' and a second bend portion 3132'. On the other hand, the second upper connection group 320 includes a second floating connection seat 321', a second extension plate 323', a plurality of second pins 324', a second fixing unit 325', two second elastic support members 326', a support portion 3211', a contact section 3241', a first bend portion 3231' and a second bend portion 3232'. A front side of the first floating connection seat 311' and a front side of the second floating connection seat 321' are configured face to face.

The first pins 314' are disposed at the first floating connection seat 311', and each has the contact section 311' exposed from a top surface of the first floating connection seat 311', wherein contact sections are for abutting against the first electrode region 110 (referring to FIG. 2) of the battery detection frame 100. An end portion of each first pin 314' opposite to the contact section 3141' is for coupling to the first extension plate 313'. For example, the first pins 314' are indirectly electrically connected to the first extension plate 313' via solder, or the first pins 314' are directly electrically connected to the first extension plate 313'.

As shown in FIG. 6, the first extension plate 313' is disposed to extend from the upper surface of the first polarity plate 301, extend toward a direction of the second polarity plate 302 and extend through below the first floating connection seat 311' via the first bend portion 3131', and further extend to the front side of the first floating connection seat 311' via the second bend portion 3132'.

The first fixing unit 315' passes through the first extension plate 313' and fixes one end of the first extension plate 313' on the front side of the first floating connection seat 311'. The first floating connection seat 311' has the support portion 3111' extending from each of both sides thereof. One end of each first elastic support member 316' passes through the first polarity plate 301 and is disposed at the base 303, and the other end of each first elastic support member 316' is disposed at the first floating connection seat 311', so as to provide the first floating connection seat 311' with support. Moreover, each first elastic support member 316', while the first floating connection seat 311' receives an external force (referring to FIG. 2) from a downward pressure of the first electrode region 110 of the battery detection frame 100, is for providing a restoring force, so as to increase the stability of the electrical connection between the contact section 3141' of the first pin 314' and the first electrode region 110.

In the second embodiment, configuration details of the second upper connection group 320 are similar to the configuration details of the first upper connection group 310, and such repeated details of the second upper connection group 320 are omitted.

Moreover, as shown in FIG. 5 and FIG. 6, a position at which the first lower connection member 319 is coupled to the first polarity plate 301 is different from a position at which the first extension member 313' is coupled to the first polarity plate 301, and the contact section 3141' of the first pin 314' for abutting against the first electrode region 110 of the battery detection frame 100 is not affected when the first lower connection member 319 is abutted (referring to FIG. 2). Moreover, a position at which the second lower connection member 329 is coupled to the second polarity plate 302 is different from a position at which the second extension member 323' is coupled to the second polarity plate 302, and the contact section 3241' of the second pin 324' for abutting against the second electrode region 120 of the battery detection frame 100 is not affected when second lower connection member 329 is abutted (referring to FIG. 2).

Figure 7:
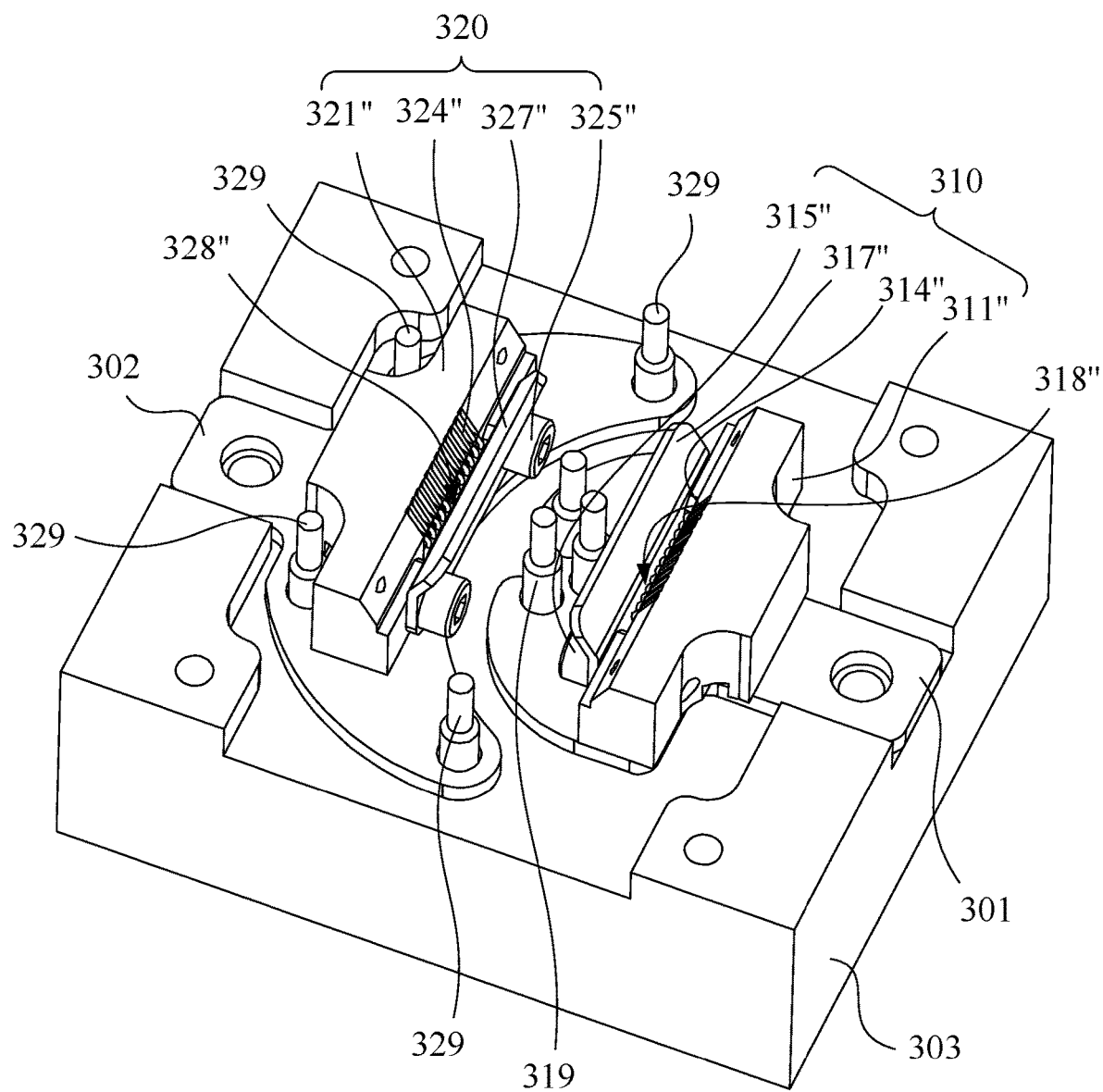
FIG. 7 is a perspective schematic diagram of a probe module according to a third embodiment of the present invention.
Figure 8:
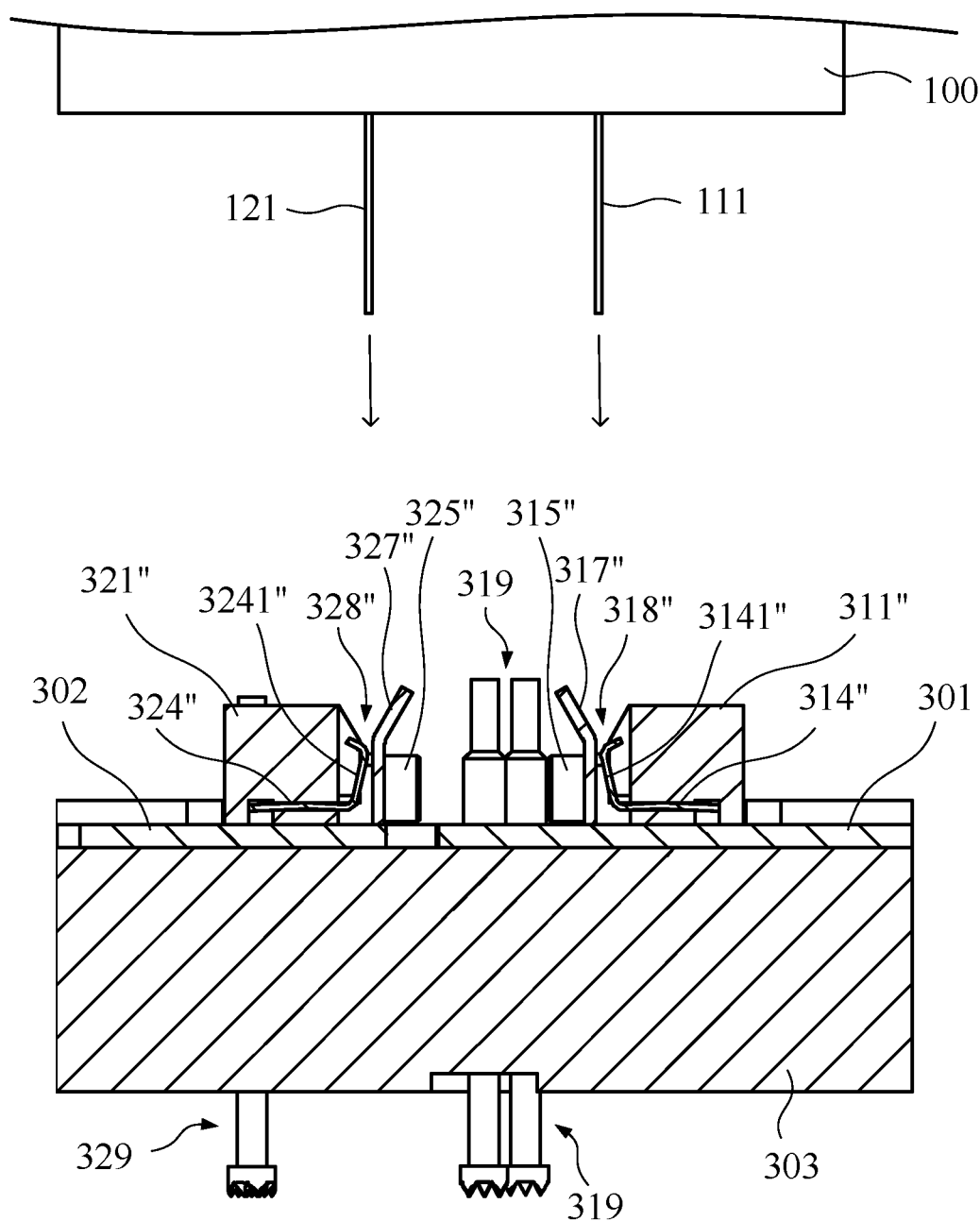
FIG. 8 is a partial section schematic diagram of a probe module according to the third embodiment of the present invention.

Referring to both FIG. 7 and FIG. 8, FIG. 7 shows a perspective schematic diagram of a probe module according to a third embodiment of the present invention, and FIG. 8 shows a partial section schematic diagram of a probe module according to the third embodiment of the present invention.

Referring to FIG. 2 for comparison, in the third embodiment, the battery detection frame 100 is provided with a first insert piece 111 serving as the first electrode region 110 and a second insert piece 121 serving as the second electrode region 120.

The first upper connection group 310 includes a first connection seat 311", a first fixing unit 315", a first pressing piece 317", a plurality of first pins 314", a first insert slot 318" and a contact section 3141". On the other hand, the second upper connection group 320 includes a second connection seat 321", a second fixing unit 325", a second pressing piece 327", a plurality of second pins 324", a second insert slot 328" and a contact section 3241".

As shown in FIG. 7 and FIG. 8, the first connection seat 311" is configured on the upper surface of the first polarity plate 301. The first pressing piece 317" is fixed to the first connection seat 311" via the first fixing unit 315", and is at the same time located on a front side of the first connection seat 311". Moreover, with the coordination of relative positions of the first pressing piece 317" and the first connection seat 311", a distance is present between the first pressing piece 317" and the first connection seat 311", and this distance forms the first insert slot 318" for insertion of the first insert piece 111. An upper section of the first pressing piece 317" may be further provided with a sloped portion having a guiding function, so as to promote the first insert piece 111 to be correctly inserted into the first insert slot 318".

The first pins 314" are disposed at the first connection seat 311", and each has the contact section 3141" protruding from the front side of the first connection seat 311". The contact section 3141" of each first pin 314" is for abutting against the first insert piece 111 inserted into the first insert slot 318". An end portion of each first pin 314" opposite to the contact section 3141" is for coupling to the first polarity plate 301. For example, the first pins 314" are indirectly electrically connected to the first polarity plate 301 via solder, or the first pins 314" are directly electrically connected to the first polarity plate 301.

Thus, when the probe module 300 is disposed on the battery detection frame 100, the first insert piece 111 is inserted into the first insert slot 318" to form coupling between the first insert piece 111 and the first polarity plate 301, for a subsequent detection procedure to be carried out.

In the third embodiment, configuration details of the second upper connection group 320 are similar to the configuration details of the first upper connection group 310, and such repeated details of the second upper connection group 320 are omitted.

Moreover, as shown in FIG. 7 and FIG. 8, a position at which the first lower connection member 319 is coupled to the first polarity plate 301 is different from a position at which each first pin 314" is coupled to the first polarity plate 301, and the contact section 3141" of the first pin 314" for abutting against the first insert piece 111 is not affected when the first lower connection member 319 is abutted. Moreover, a position at which the second lower connection member 329 is coupled to the second polarity plate 302 is different from a position at which each second pin 324" is coupled to the second polarity plate 302, and the contact section 3241" of the second pin 324" for abutting against the second insert piece 121 is not affected when the second lower connection member 329 is abutted.

Figure 9:
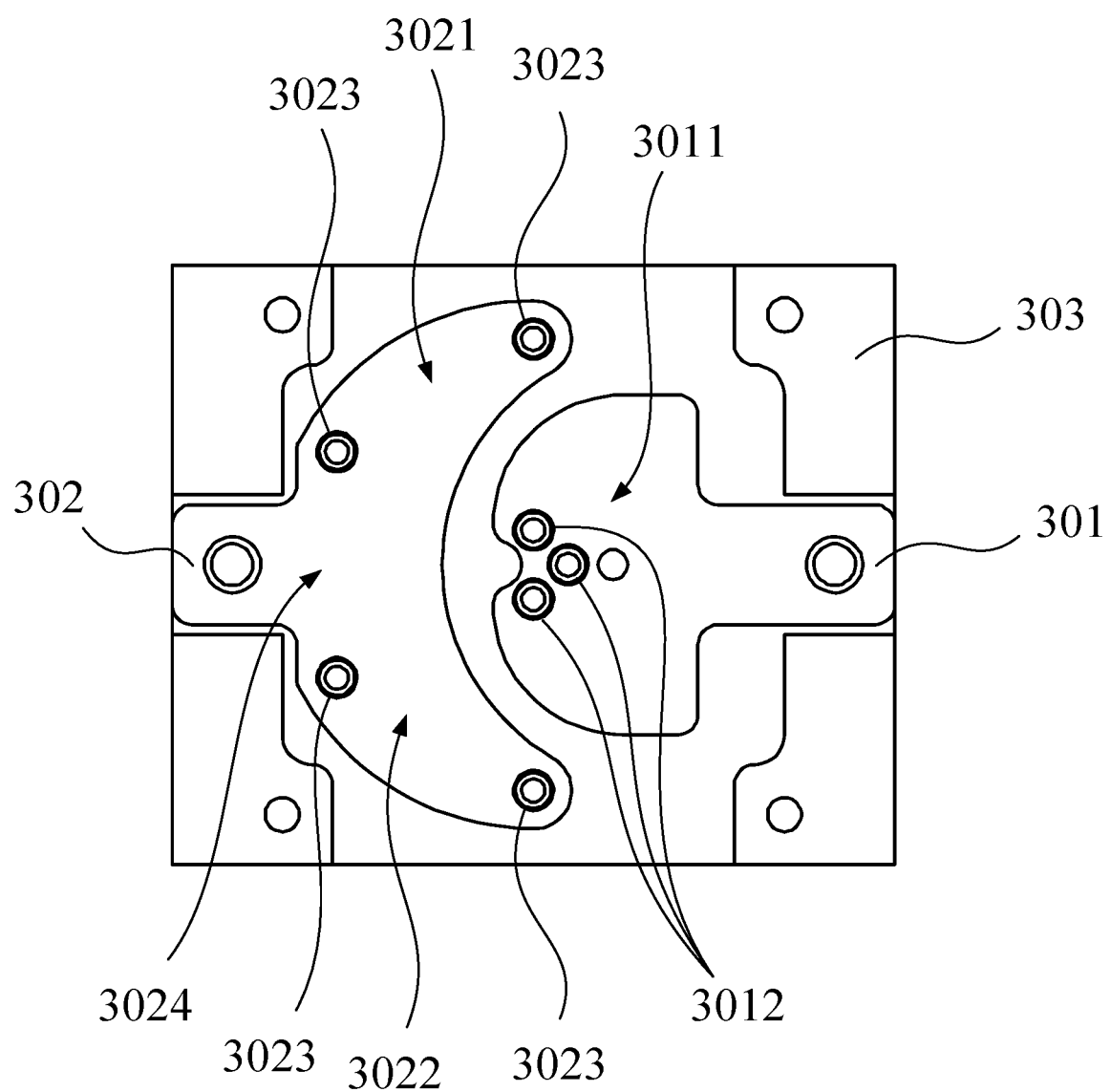
FIG. 9 is a schematic diagram of a polarity plate on a probe module according to an embodiment of the present invention.

FIG. 9 shows a schematic diagram of a polarity plate on a probe module according to an embodiment of the present invention. The second polarity plate 302 has two surrounding portions 3021 and 3022 extending toward both sides of the base 303 on an upper surface of the base 303, wherein these two surrounding portions 3021 and 3022 surround a portion of the first polarity plate 301. As shown in the drawings, the two surrounding portions 3021 and 3022 surround a partial region of the front end portion 3011 of the first polarity plate 301.

Moreover, among a plurality of second connection member arrangement holes 3023, some are distributed at end portions of the two surrounding portions 3021 and 3022, and the rest are distributed at an intermediate portion 3024 of the second polarity plate 302 and neighboring to the two surrounding portions 3021 and 3022. A plurality of first lower connection member arrangement holes 3012 are distributed at the front end portion 3011 of the first polarity plate 301, wherein the front end portion 3011 is close to the second polarity plate 302. Thus, the stability of the probe module 300 serving as the electrical connection interface between the battery detection frame 100 and the battery under test 200 is further promoted.

In conclusion, on the basis of the disclosures of the embodiments above, the cables fixed on the battery detection frame do not need to be processed each time a probe module is replaced. In addition, each polarity has dedicated coupling elements respectively corresponding to the battery detection frame and the battery under test, and this effectively enhances the reliabilities of the probe module and the detection device thereof.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. A probe module, for providing corresponding electrical connection path between a first electrode region and a second electrode region of a battery detection frame and a battery under test, the probe module comprising:
   a base;
   a first polarity plate, carried on an upper surface of the base;
   a second polarity plate, carried on the upper surface of the base, and spaced from the first polarity plate;
   a first upper connection group, for providing electrical connection path between the battery detection frame and the first polarity plate;
   a second upper connection group, for providing electrical connection path between the battery detection frame and the second polarity plate;
   at least one first lower connection member, passing through the base and coupled to the first polarity plate, the first lower connection member protruding downward from a lower surface of the base, and being telescopic so as to movably provide electrical connection path between the battery under test and the first polarity plate; and
   at least one second lower connection member, passing through the base and coupled to the second polarity plate, the second lower connection member protruding downward from the lower surface of the base, and being telescopic so as to movably provide electrical connection path between the battery under test and the second polarity plate.

2. The probe module according to claim 1, wherein the first upper connection group comprises:
   a first connection seat, configured on an upper surface of the first polarity plate; and
   at least one first upper connection member, disposed on the first connection seat, a lower end of the first upper connection member coupled to the first polarity plate, and an upper end of the first connection member being telescopic so as to movably abut against the first electrode region.

3. The probe module according to claim 2, wherein the second upper connection group comprises:
   a second connection seat, configured on an upper surface of the second polarity plate; and
   at least one second upper connection member, disposed on the second connection seat, a lower end of the second upper connection member coupled to the second polarity plate, and an upper end of the second connection member being telescopic so as to movably abut against a second electrode region.

4. The probe module according to claim 3, wherein the first upper connection member and the second upper connection member are pogo pins.

5. The probe module according to claim 2, wherein the battery detection frame is provided with a first insert piece serving as the first electrode region, and the first upper connection group comprises:
   a first connection seat, configured on the upper surface of the first polarity plate;
   at least one first fixing unit;
   a first pressing piece, configured on a front side of the first connection seat via the first fixing unit, wherein a gap is present between the first pressing piece and the first connection seat so as to form a first insert slot for insertion of the first insert piece; and
   a plurality of first pins, disposed at the first connection seat and each having a contact section protruding from the front side of the first connection seat, the contact section of each first pin for abutting against the first insert piece inserted in the first insert slot, wherein one end of each first pin opposite to the contact section is coupled to the first polarity plate.

6. The probe module according to claim 5, wherein the battery detection frame is provided with a second insert piece serving as the second electrode region, and the second upper connection group comprises:
   a second connection seat, configured on the upper surface of the second polarity plate;
   at least one second fixing unit;
   a second pressing piece, configured on a front side of the second connection seat via the second fixing unit, wherein a gap is present between the second pressing piece and the second connection seat so as to form a second insert slot for insertion of the second insert piece; and
   a plurality of second pins, disposed at the second connection seat and each having a contact section protruding from the front side of the second connection seat, the contact section of each second pin for abutting against the second insert piece inserted in the second insert slot, wherein one end of each second pin opposite to the contact section is coupled to the second polarity plate.

7. The probe module according to claim 1, wherein the first upper connection group comprises:
   a first floating connection seat, having a support portion extending from each of both sides thereof;
   a first extension plate, extending from an upper surface of the first polarity plate, extending toward a direction of the second polarity plate and extending through below the first floating connection seat via a first bend portion, and extending to a front side of the first floating connection seat via a second bend portion;
   a plurality of first pins, disposed at the first floating connection seat and each having a contact section exposed from a top surface of the first floating connection seat, the contact section for abutting against the first electrode region, wherein one end of each first pin opposite to the contact section is coupled to the first extension plate;
   at least one first fixing unit, passing through the first extension plate, and fixing one end of the first extension plate on the front side of the first floating connection seat; and
   two first elastic support members, one end of each first elastic support member passing through the first polarity plate and disposed at the base, and one other end disposed at the first floating connection seat, each first elastic support member providing the first floating connection seat with a restoring force when receiving an external force from a downward pressure.

8. The probe module according to claim 7, wherein the second upper connection group comprises:
   a second floating connection seat, having a support portion extending from each of both sides thereof;
   a second extension plate, extending from an upper surface of the second polarity plate, extending toward a direction of the first polarity plate and extending through below the second floating connection seat via a first bend portion, and extending to a front side of the second floating connection seat via a second bend portion;
   a plurality of second pins, arranged at the second floating connection seat and each having a contact section exposed from a top surface of the second floating connection seat, the contact section for abutting against the second electrode region, wherein one end of each second pin opposite to the contact section is coupled to the second extension plate;
   at least one second fixing unit, passing through the second extension plate, and fixing one end of the second extension plate on the front side of the second floating connection seat; and
   two second elastic support members, one end of each second elastic support member passing through the second polarity plate and disposed at the base, and one other end disposed at the second floating connection seat, each second elastic support member providing the second floating connection seat with a restoring force when receiving an external force from a downward pressure.

9. The probe module according to claim 1, wherein the second polarity plate has two surrounding portions extending toward both sides of the base on the upper surface of the base, and the two surrounding portions surround a portion of the first polarity plate.

10. The probe module according to claim 9, wherein the second lower connection member is plural in quantity, these second lower connection members comprise two second lower connection members respectively connected to end portions of the two surrounding portions and at least one second lower connection member connected to an intermediate portion of the second polarity plate, and the first lower connection member is connected to the first polarity plate at a position close to a front end of the second polarity plate.

11. The probe module according to claim 9, wherein the first upper connection group is disposed on the first polarity plate and is for coupling to the first electrode region once the base is fixed at the battery detection frame, and the second upper connection group is disposed on the second polarity plate and is for coupling to the second electrode region once the base is fixed at the battery detection frame.

12. The probe module according to claim 9, wherein the first lower connection member and the second lower connection member are pogo pins.

13. A detection device, comprising:
   a battery detection frame, comprising a plurality of electrode portions coupled to a battery under test via connections of cables in one-on-one correspondence, wherein each electrode portion has a first electrode region and a second electrode region; and
   a plurality of probe modules according to claim 1, the probe modules fixed on the battery detection frame and for providing electrical connection paths between the battery detection frame and the battery under test.

* * * * *